J. HONSINGER.
ROOT HARVESTER.
APPLICATION FILED SEPT. 27, 1920.
1,436,396.
Patented Nov. 21, 1922.
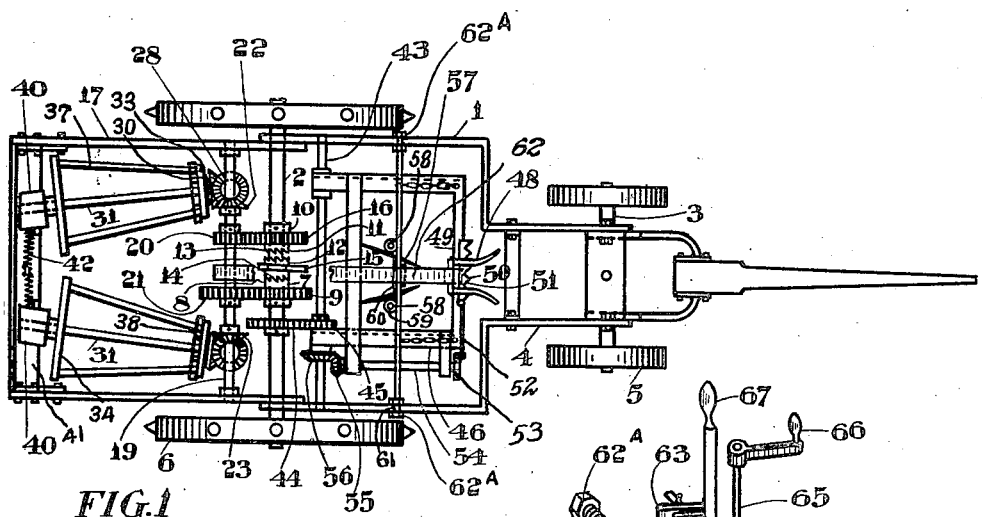
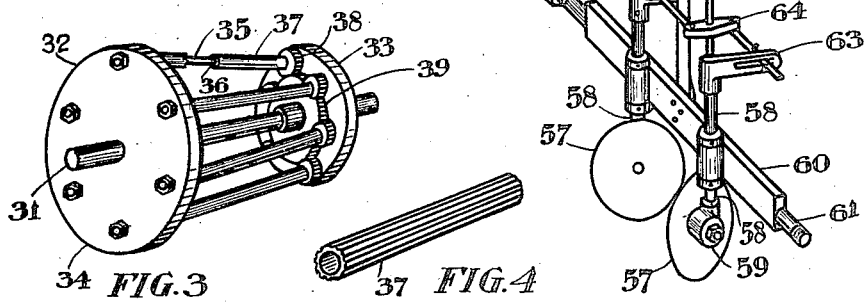
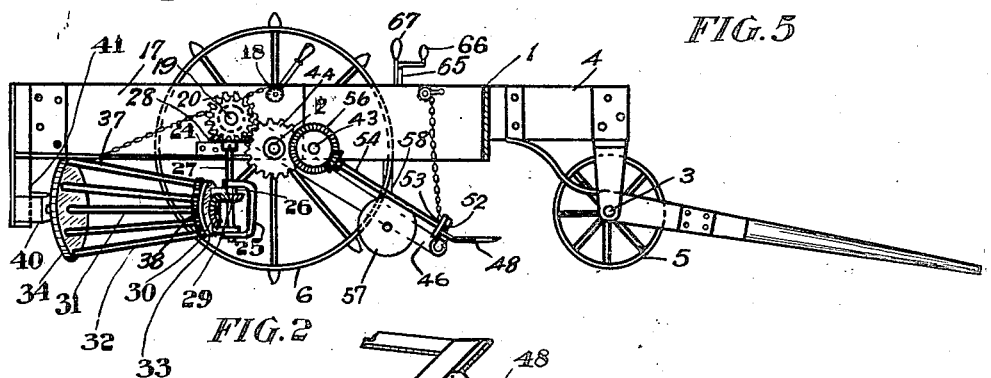
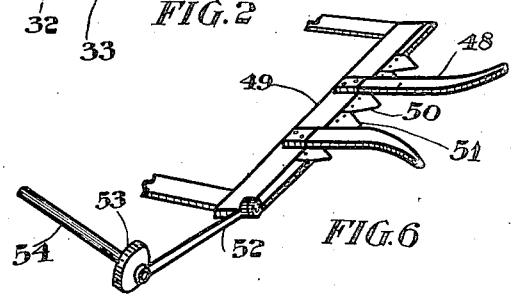
INVENTOR
J. Honsinger
BY C. J. Featherstonhaugh
ATTORNEY Patented Nov. 21, 1922.

1,436,396

UNITED STATES PATENT OFFICE.

JOEL HONSINGER, OF MONTREAL, QUEBEC, CANADA.

ROOT HARVESTER.

Application filed September 27, 1920. Serial No. 413,182.

*To all whom it may concern:*

Be it known that I, JOEL HONSINGER, a subject of the King of Great Britain, and residing at 779 Marquette Street, in the city and District of Montreal, in the Province of Quebec, in the Dominion of Canada, have invented a new and useful Root Harvester, of which the following is a specification.

The invention relates to root harvesters as described in the present specification and illustrated in the accompanying drawings, that form part of the same.

The invention consists essentially of the novel means employed whereby the roots are gathered in revolving crates following the removal of the tops.

The objects of the invention are to facilitate the harvesting of beets or like root vegetables, to eliminate as much as possible the manual labor usually required to gather the roots; to simplify the operating parts in such machines; to insure the engagement of the crates with the roots and the consequent gathering of the same; and generally to provide an efficient and a durable harvesting machine.

In the drawings, Figure 1 is a plan view of the machine.

Figure 2 is a side elevation of the machine with one wheel and one side of the frame removed.

Figure 3 is a perspective detail of a crate gatherer.

Figure 4 is a perspective detail of a roller sleeve.

Figure 5 is a perspective detail of the earth clearing mechanism.

Figure 6 is a perspective detail of the top cutter.

Like numerals of reference indicate corresponding parts in each figure.

Referring to the drawings, the main frame 1 is supported by the rear axle 2 and front axles 3, the latter being journalled in the reduced front end 4 of the said main frame.

The running gear comprises the front wheels 5 and the rear wheels 6, the latter being fixedly mounted on the axle 2 and rotating said axle in the operation of the machine.

The sleeve 7 formed at one end into a ratchet clutch member is loosely mounted on the axle 2 and the gear wheel 9 is fixedly mounted on said sleeve 7 said gear wheel being the driving gear for one speed of the gathering mechanism.

The sleeve 10 is loosely mounted on the axle 2 and formed at one end into a ratchet clutch member 11.

The ratchet clutch member 12 having ratchets 13 and 14 at the ends respectively is slidably and non-rotatively mounted on the axle 2 between the ratchet clutches 8 and 11 and is operated in any suitable manner by the lever 15 to one or the other speeds or to the neutral central position between the driving gear 9 of the one speed and the driving gear 16 fixedly mounted on the sleeve 10 and representing the other speed.

The auxiliary shaft 19 is journalled in the sides of frame 17 and the driven gears 20 and 21 are fixedly mounted on said shaft 19 and are operated by the gears 16 and 9 respectively.

The bevel gears 22 and 23 are also fixedly mounted on the shaft 19, one towards one end and the other towards the other end.

The hangers 24 and 25 support the bearings 26 for the vertical shafts 27 the latter carrying at the upper ends the bevel gears 28 driven by the bevel gears 22 and 23 and at the lower ends the bevel gears 29, driving the bevel gears 30. The bevel gears 30 are mounted on the shafts 31 journalled respectively in the hangers 25 and 41, and each shaft 31 carries a crate form of gatherer 32.

The crate gatherers 32 are of taper shape having a smaller disc 33 at the front ends and a larger disc 34 at the rear ends. The discs 33 and 34 are joined by rods 35 suitably spaced, and each rod is encased in a sleeve roller 36 and the latter are covered by a corrugated rubber tube 37.

The pinions 38 are fixedly mounted at the front ends of the rollers 36 and are engaged by the spur gear 39 mounted on the shafts 31, the latter extending into the bearings 40 supported by the hangers 41 depending from the back of the frame 17 and forming a slide for the bearings 40, which are resiliently held by the spring 42.

The shaft 43 is journalled in the main frame 1 and is driven by the driving gear 44 fixedly mounted on the axle 2 and driving the pinion 45 fixedly mounted on the shaft 43.

The guides 48 extend forwardly from the cutter bar 49 and flare outwardly at the ends and the knife 50 having the blades 51 is slidably arranged in said bar and at one end pivotally connected to the rod 52, the latter being connected at its other end to the pitman 53 at the end of the shaft 54. The shaft 54 is journalled in bearings supported by the cutter bar frame 46 and at its upper end carries the pinion 55, which is driven by the pinion 56 mounted on the shaft 43.

The disc trowels 57 are fixedly secured to the lower ends of the rods 58 and the latter are slidably arranged in the bearings 59, the latter being rigidly secured or forming part with the transverse bar 60 terminating in the bolt ends 61 projecting through the sides of the frame 1 and held by the nuts 62ᴬ.

The cranks 63 are mounted on the upper ends of the rods 58 and are connected to the ends respectively of the rocker arm 64 mounted on the vertical rod 65 operated by the handle 66 to swing the discs and raise and lower the same.

The discs are entirely cleared of the ground by the lever 67 operating the bar 60, which is journalled in the frames at the bolt ends 61 and rotates thereby carrying said discs from their working position.

In the operation of this machine the draft rigging 61 is attached to the reduced front end of the main frame 1 or a motor truck as found convenient and as the axle 2 turns the auxiliary shafts in the rear and front frames are coincidently driven, the former at the desired speed.

The rear auxiliary shaft rotates the crate gatherers through the bevel gear transmissions and also the rollers, so that not only do the crates revolve, but the rollers which engage the roots.

The machine progressing first engages the tops of the beets or other roots at the cutter bar, which is adjusted accordingly, and as the knife is reciprocated by the pitman and bevel gear transmission, the tops of the beets are cut off and carried by the endless carrier 62 and dropped behind the machine.

The disc trowels engage the earth beside the roots and clear it away, so that when the crate members reach the projecting roots, the latter are caught between the rollers and drawn from the ground.

The resiliency of the crate members provides for any unevenness in the direction of travel, and the corrugated rubber covers insure a reliable grip on the roots in the act of pulling them out.

It must be understood that without departing from the spirit of the invention, various changes may be made and it is in the claims for novelty following that the novel elements are set forth in the broadest sense as permitted by the state of the art.

What I claim is:—

1. In a root harvesting machine, a frame, running gear supporting said frame, an axle rotated by the tractive force of said machine, an auxiliary shaft driven from said axle, and gathering members in crate form rotated through said auxiliary shaft, and having rotating members engaging the roots.

2. In a root harvesting machine, a frame, running gear supporting said frame, an axle rotated by the tractive force of said machine, a plurality of auxiliary shafts driven from said axle, a top cutting mechanism operated by said axle through an auxiliary shaft, and gathering members in crate form having longitudinal rods and rollers on said rods driven by power transmitted from said axle coincidently with the driving of the crates.

3. In a root harvesting machine, a frame, running gear supporting said frame, an axle rotated by the tractive force of said machine, and gathering members in crate form having longitudinal rods, rollers on said rods and corrugated rubber covers on said rollers, and gear transmissions operatively connecting said axle with said crates and said rollers.

4. In a root harvesting machine, a frame, running gear supporting said frame, an axle rotated by the tractive force of said machine, an auxiliary shaft driven from said axle, gathering members in tapered crate form having rods connecting disc ends and sleeve rollers on said rods and a central shaft, a spur gear mounted on each crate shaft, a pinion mounted on each of said rollers and coacting with said spur gear, a bevel gear mounted on each of said crate shafts, coacting bevel gears driving said crates, hangers supporting bearings for the driving mechanism of the crates, vertical shafts carrying said coacting bevel gears at their lower ends and bevel gears at their upper ends, bevel gears suitably mounted and driving the aforesaid bevel gears, driving gears on said axle and driving gears on said auxiliary shaft.

Signed at the city of Montreal, in the Province of Quebec, in the Dominion of Canada, this 13th day of August, 1920.

JOEL HONSINGER.